US007676947B2

(12) United States Patent
Borozny et al.

(10) Patent No.: US 7,676,947 B2
(45) Date of Patent: Mar. 16, 2010

(54) ADHESIVE LABEL APPLICATION SYSTEM

(75) Inventors: Damon Borozny, Atlanta, GA (US); Nakita Pope, Atlanta, GA (US); David Baumgarten, 144 Ottley Dr., Atlanta, GA (US) 30324

(73) Assignee: David Baumgarten, Atlanta, GA (US)

( * ) Notice: Subject to any disclaimer, the term of this patent is extended or adjusted under 35 U.S.C. 154(b) by 164 days.

(21) Appl. No.: 12/156,924

(22) Filed: Jun. 4, 2008

(65) Prior Publication Data

US 2008/0295351 A1 Dec. 4, 2008

Related U.S. Application Data

(60) Provisional application No. 60/933,252, filed on Jun. 4, 2007.

(51) Int. Cl.
*G01B 5/25* (2006.01)

(52) U.S. Cl. .......................................... 33/613; 283/81

(58) Field of Classification Search .................. 33/613, 33/645; 283/81

See application file for complete search history.

(56) References Cited

U.S. PATENT DOCUMENTS

| | | | | |
|---|---|---|---|---|
| 4,925,716 | A * | 5/1990 | Haas | 283/81 |
| 5,560,657 | A * | 10/1996 | Morgan | 283/81 |
| 5,680,709 | A * | 10/1997 | Stone | 33/613 |
| 6,595,550 | B1 * | 7/2003 | Meazzi | 283/81 |
| 2002/0093189 | A1 * | 7/2002 | Krupa | 283/81 |
| 2006/0113788 | A1 * | 6/2006 | Riley | 283/81 |
| 2007/0024050 | A1 * | 2/2007 | White et al. | 283/81 |
| 2008/0061548 | A1 * | 3/2008 | Kuranda et al. | 283/31 |
| 2008/0238083 | A1 * | 10/2008 | Warford | 283/81 |
| 2009/0001708 | A1 * | 1/2009 | Haas | 283/81 |
| 2009/0031602 | A1 * | 2/2009 | Riley | 283/81 |
| 2009/0058073 | A1 * | 3/2009 | George | 283/81 |

* cited by examiner

*Primary Examiner*—G. Bradley Bennett
(74) *Attorney, Agent, or Firm*—David Dolberg, Esq.

(57) ABSTRACT

A label printing kit, system, and method of use is disclosed which enables a user to print and easily apply labels to one or more units of a product with precise registration of the label on each unit of the product. The system utilizes labels with adhesive on a backside and a jig so that the labels can be easily, rapidly, and precisely applied manually to one or more units of a particular product, item or object.

12 Claims, 5 Drawing Sheets

ADHESIVE LABEL APPLICATION SYSTEM

This application claims priority from provisional application 60/933,252, filed Jun. 4, 2007.

FIELD OF THE INVENTION

The invention relates to devices and methods of using the devices for the application of adhesive labels to objects.

BACKGROUND

Many commercial products, purchased in multiple units and used internally by companies or as promotional items, have a name or logo imprinted on them or alternatively have a name or logo printed on a label which is then mechanically affixed to each unit. Typically, when such a product is ordered from a supplier, the customer provides the specifications for imprint and the number of units required and the product is mechanically imprinted by the supplier. This is a system where the higher volume of imprints the lower the per piece costs. This system makes it cost prohibitive to order a small number of units with imprint. An alternative is to order the desired number of units of product along with blank labels which can be printed and placed on each unit of the product by the consumer. Applying the labels in this manner makes it difficult to ensure that each label is registered or neatly and reproducibly placed in the identical location on each unit of product.

The advent of personal computer systems with printers and internet and web-based printing systems has facilitated the ability of users to print their own labels for multiple units of a product. Davis, U.S. Ser. No. 05/825,996, discloses a personal computer system for printing completely to the edge of a label or other printed product using a personal computer. Wien, U.S. Ser. No. 06/481,572, discloses multi-layer sheet assemblies designed for easy feeding into and through printers. However, none of the disclosures provide for a means or method of easily registering the placement of the printed labels on multiple units of a product.

SUMMARY OF THE INVENTION

A label application kit, system, and method of use is disclosed which utilizes labels with adhesive on a backside and a jig so that the labels can easily, rapidly, and precisely be applied manually to multiple units of a particular product, item, or object. The method comprises:

a. providing a label sheet comprising a top and backing sheet, said top sheet with a top side and a back side, said back side coated with an adhesive coating, the top sheet removably adhesed to the backing sheet and forming a combination said combination comprising one or more removable protolabels, each protolabel comprising a label and a registration tab and said label comprising a first and second subregion;
b. providing a jig fabricated to receive said product and fabricated to additionally receive the protolabel;
c. placing the product into the jig, the product having a label location fabricated to receive a label;
d. removing a protolabel from the label sheet such that the backing sheet is removably affixed to said registration tab, and said first subregion and the second subregion is not affixed;
e. placing the protolabel in the jig such that the label is proximate to the label location on the product;
f. manually adhesing the label second subregion to the product label location;
g. separating the label from the registration tab and removing the registration tab from the jig; and,
h. adhesing the label first subregion to the product.

An interactive method of custom printing labels for use in conjunction with the system is also provided. In an embodiment, a web-based application is used to enable the user to set up the printing of one or more sheets of labels on a printer at the user's work station. In another embodiment a personal computer and printer is used in conjunction with software provided to allow a user to custom design and print a label, or one or more sheets of labels, for use in conjunction with a jig for consistent placement on multiple units of a particular product.

Typically, the blank labels provided on a label sheet, and the jig, are provided as a kit, along with the product for which the label is intended to be applied. This system has an advantage over the traditional method of ordering custom printed or imprinted items, products, or merchandise from a provider in that placing such an order usually requires a minimum number of units to be cost effective, while the instant invention allows the user to choose a small number of required labels. In the kit, one or more sheets of labels designed for a particular placement on a specific product is provided. The jig for aligning the labels on the product is specifically fabricated for that product. Optionally, one or more units of product upon which the label is to be placed are also provided. The labels and associated backing are dimensioned and designed to work with the jig which in turn is dimensioned to work with the product. The label sheet is dimensioned to fit a standard computer printer.

The label sheet (FIG. 1) comprises one or more protolabels which are perforated for removal from the top 10 and backing 12 sheets. Each protolabel 11 (FIG. 2A) comprises a label 22 and registration tab 23 (from the top sheet), in which each label is precut, as well as the backing 27 from the backing sheet which is adhesed to the registration tab and a subregion of the label as described below. The front side of the label is designed to receive printing. The adhesive coating on the back side of the top sheet is protected with the backing sheet 12. Each protolabel is designed to be removable from the sheet as a protolabel/backing combination (top sheet and backing sheeting) and is perforated for removal by the user. The label sheet is dimensioned to be accommodated by a standard computer printer.

In an embodiment, the user accesses a web site and using an online application, uploads the image desired to be printed identically on each label on the sheet—written text, company name, logo, or design. The user saves the completed design, outputs a file for printing on each label on the label sheet, and prints the required number of labels and sheets.

In an embodiment, software is provided which enables the user to upload images on a personal computer and design the label.

Once the labels have been printed, the user removes a protolabel 11 with backing from the sheet. The backing sheet 12 is perforated 13 such that, when the protolabel is removed, the backing which covers all of the registration tab 23 and the first subregion 28 of the label 22 is also removed. However, the adhesive on the back side of the second subregion 26 of the label is exposed and unprotected by backing.

The user then puts the product 33 for which the label is intended into the jig 30, then puts the protolabel with backing in the jig (FIG. 3B). The jig is designed to precisely receive both the protolabel/backing combination as well as the product upon which the label is to be applied, such that the label is proximate to the product and precisely registered to the proper location for application upon the product. The user may then use manual pressure to apply the adhesive on the back side of the second subregion 26 to the product. Subsequently, the backing is removed from the first subregion of the label, the registration tab is removed and the label is fully applied to the product.

The kit optionally comprises one or more units of merchandise or product, one or more blank label sheets, an alignment check sheet, instructions, and a jig. For use in conjunction with a web-based printing application, the kit also contains instructions for accessing and using the web site.

A top sheet and backing sheet is shown containing 20 protolabel label/backing pairs.

Figure 2A:
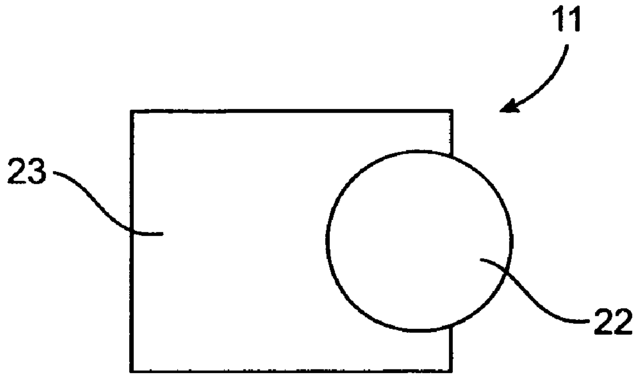

FIG. 2—Protolabel, Label and Backing

2A—a single protolabel as it would appear after removal from the sheet.

2B—an expanded view of the components of a protolabel showing the label, registration tab and backing.

Figure 3A:
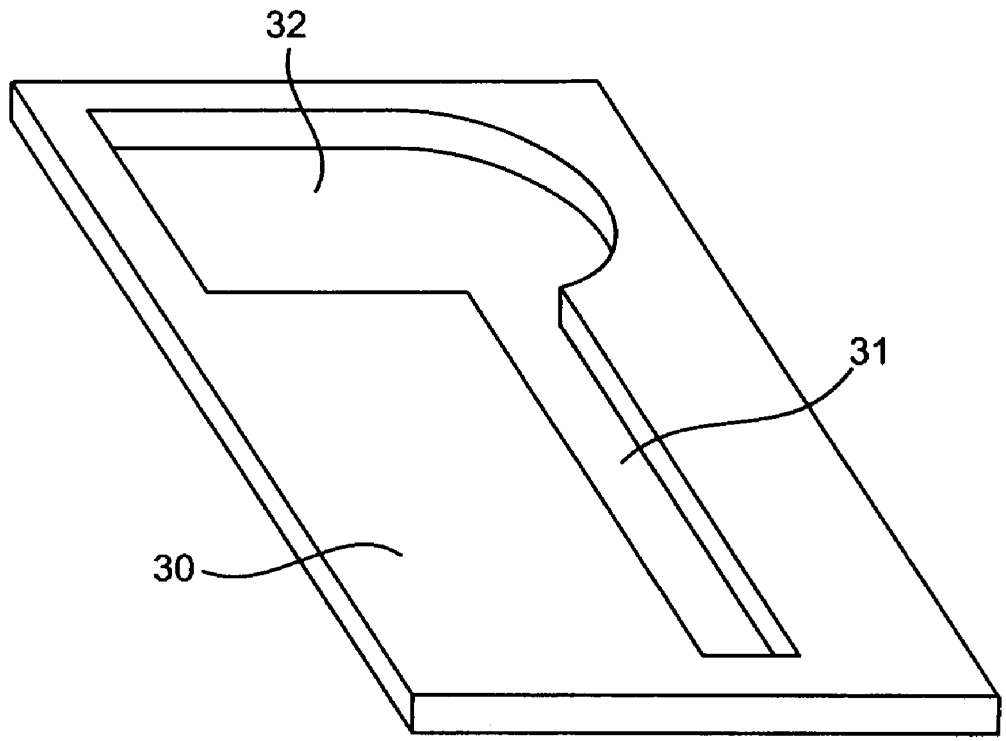
Figure 3B:
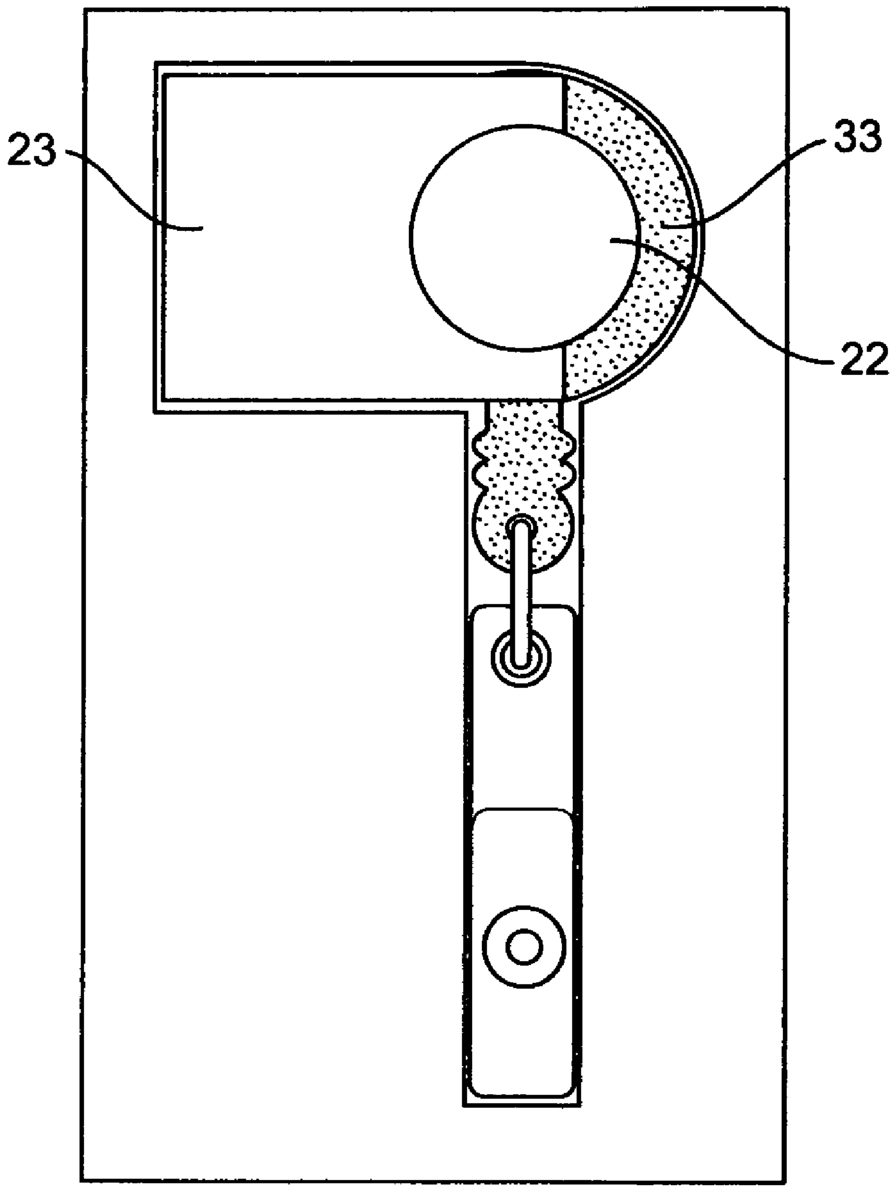

FIG. 3—Alignment Jig

3A—an alignment jig with depression which has been fabricated to receive a protolabel and a card reel product upon which the label is placed.

3B—the jig with a protolabel and a card reel product in position.

Figure 4:
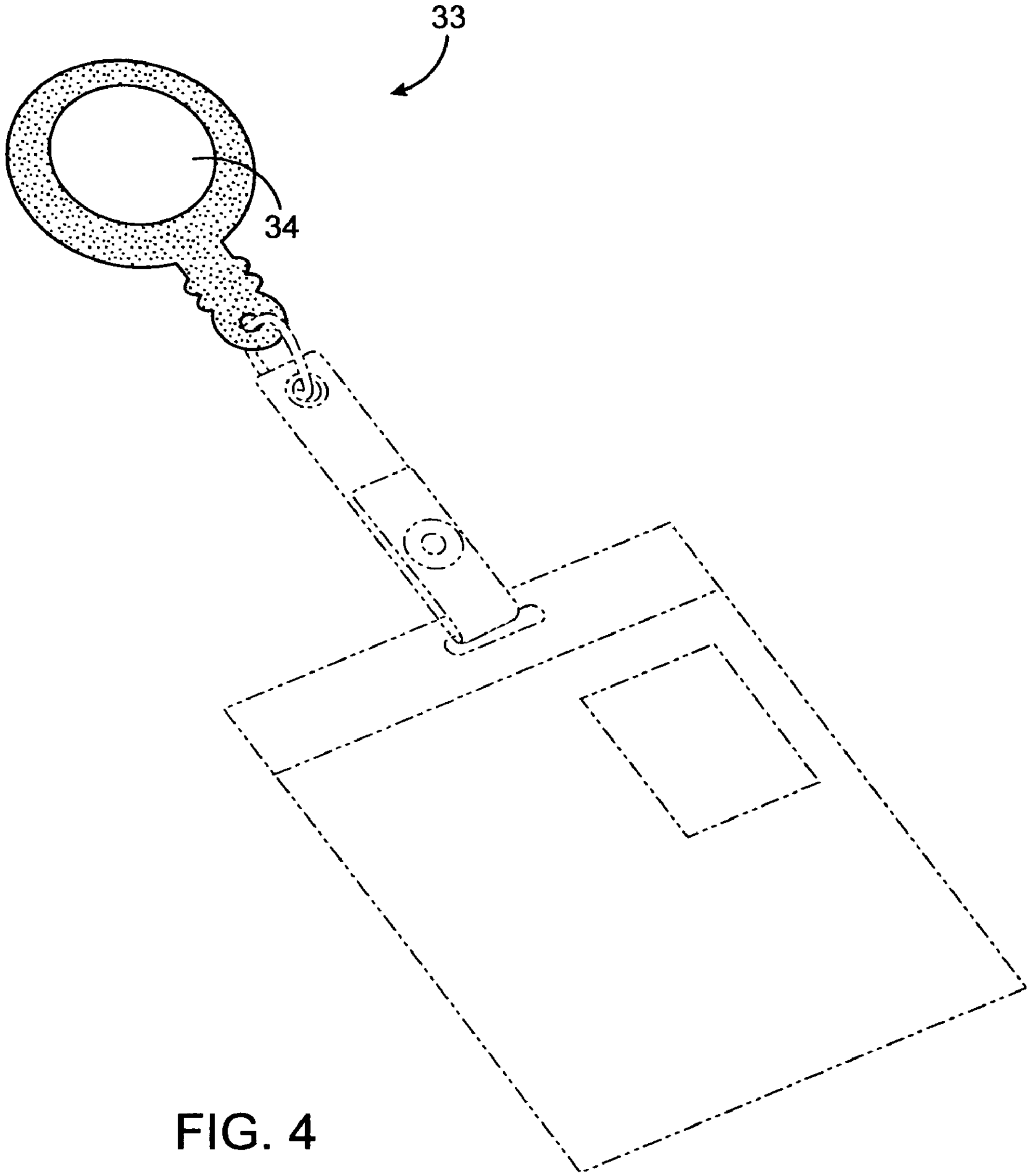

FIG. 4—a card reel product attached to a card.

DETAILED DESCRIPTION OF THE INVENTION

Definitions

As used herein, "adhese" means to affix with an adhesive.

As used herein, a "perfect" is a two dimensional shape which has been cut or perforated in a larger sheet such that it can be easily removed from the sheet. The "remainder" is the portion of the sheet which is left when the perfect is removed.

As used herein, a "protolabel" is the antecedent of a label. Thus, the protolabel comprises the label. It also comprises the registration tab and backing which is eventually removed once the label is adhesed to the product.

Figure 1:
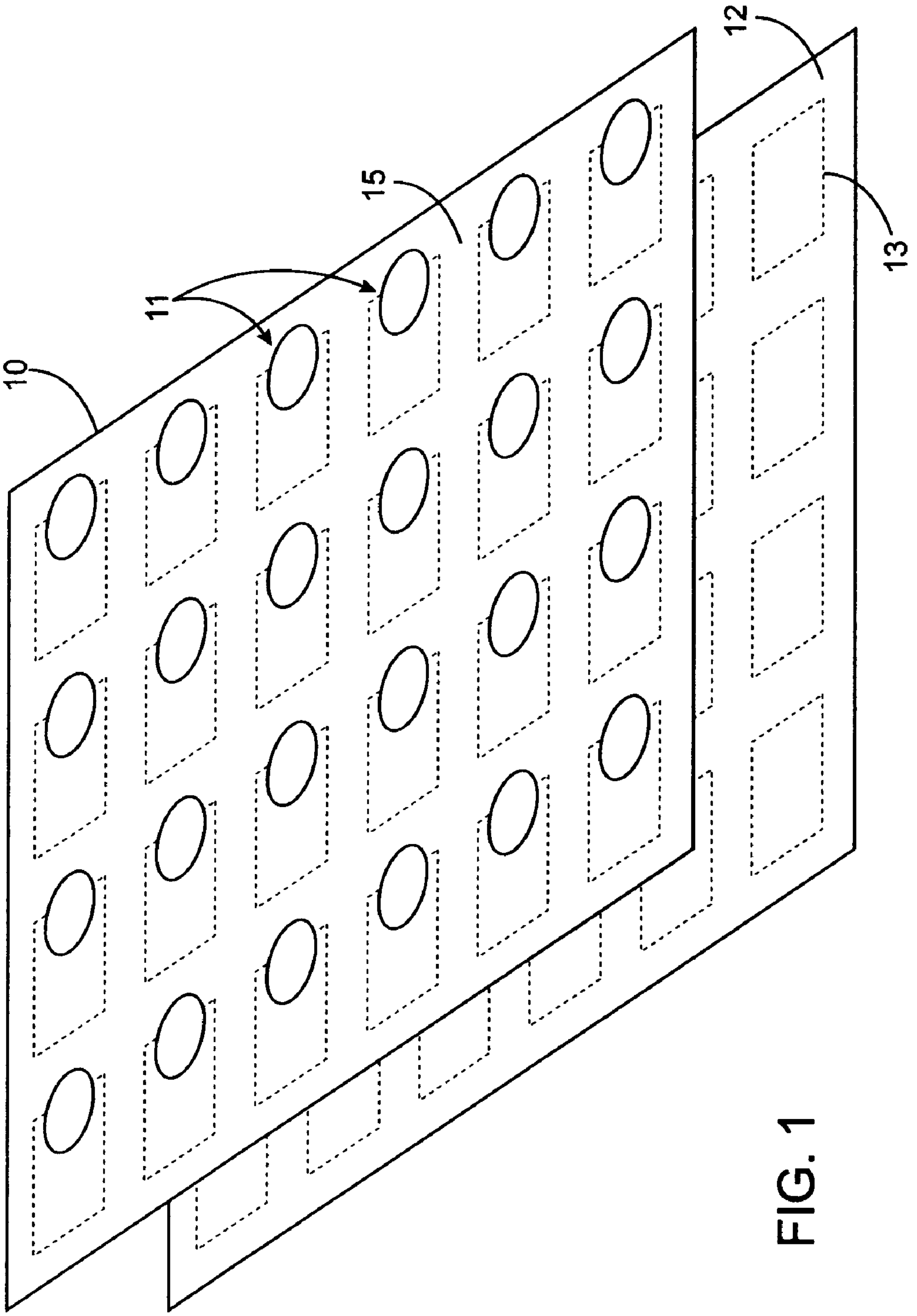
FIG. 1—Label Sheet

A label sheet is provided to the user as shown in FIG. 1. The label sheet comprises a top sheet 10 and backing sheet 12. The top sheet has a front side designed to accept printing and a back side provided with an adhesive coating. Preferably, at least one face of the backing sheet is coated with a release coating to facilitate the removal of the backing from the adhesive side of the top sheet. The top sheet has a multiplicity of protolabels 11 perforated and/or cut for easy removal.

Turning now to FIG. 2, a protolabel 11 comprises a label 22 and a registration tab 23 which is easily separable from the label. The protolabel 11 is a perfect cut from the remainder 15 (FIG. 1) in the top sheet. The top sheet 10 which comprises one or more protolabels 11 has a front and back face, and contains an adhesive coating on the back face. Thus, the back face of the protolabel 11 is removably adhesed to the backing. The labels are printed on the front face by the user. The backing protecting the adhesive coating is the backing sheet 12, preferably a release-coated paper or a wax paper. For each protolabel 11, the corresponding perfect of the backing sheet 27 is designed to be easily peeled off and removed from the adhesive side of the protolabel by the user.

The finished label 22 comprises a first subregion 28, and a second subregion 26. The perfect of the protolabel backing sheet 27 corresponds to and protects the adhesive of the registration tab 23 and the first subregion 28 of the finished label. The top and backing layers of each protolabel are perforated along their perimeters such that the pair can be easily displaced simultaneously from the top and backing sheets by the user, leaving the adhesive back face of the second subregion 26 exposed.

Figure 2B:
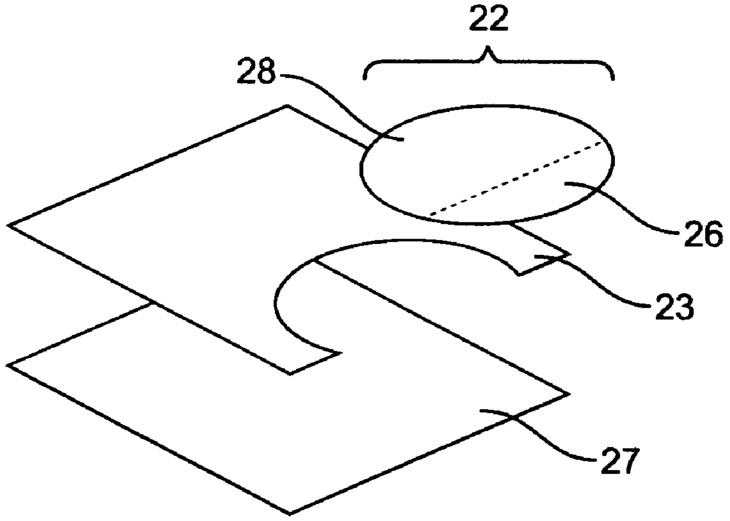

FIG. 2B shows the components of a protolabel. The top layer of the protolabel has two regions a first region 22 which is the label itself, and a second region 23 which is the registration tab. The top layer has a front side upon which the label is printed and a back side which has an adhesive coating. The backing layer 27 is a backing which is removably adhered to the adhesive on the back side of the top layer. The adhesive coatings on the back face of the second region 23 and the first subregion 28 of the label 22 are protected by the backing when the protolabel is punched out and lifted off of the label sheet.

A label sheet contains one or more protolabels. Typically, a label sheet is provided with a multiplicity of protolabels (FIG. 1). For each protolabel, the backing layer 27 corresponding to the registration tab first region 23 and the first subregion 28 of the label 22 is perforated about its perimeter. However, there is no perforation on the bottom sheet corresponding to the perimeter of the second subregion 26 of the label 22. Consequently, when the protolabel 11 is removed from the sheet, the backing which covers the entire registration tab and the first subregion of the label is also removed. However, the adhesive on the backside of an edge of the label 26 is exposed and unprotected by backing.

Turning now to FIG. 3A, an alignment jig 30 is provided. The jig is designed to accept a specific product for which the label is intended. Typically, the jig is fabricated from foam rubber, or plastic, and contains a depression 31 to receive a unit of product upon which a label is to be placed in a precise and removably fixed orientation. The jig depression is additionally fabricated 32 to receive the protolabel 11, and register with the registration tab 23 in a precise orientation. Specifically, the first region 23 of the protolabel corresponds to a region 32 of the depression in the jig such that when the product is placed in the product region 31 of the jig depression and then the protolabel is placed in its region of the jig depression 32, the label 22 is properly oriented relative to the product 33 in the jig. The jig provides for contact between the product 33 and the adhesive of the second region 26 of the label 22, and at the precise location upon the product to enable the precise location and orientation of the label upon the product. The jig is fabricated specific to each specific product.

Operation

FIG. 4 depicts a unit of product 33, which is placed in the depression 31 of the jig 30 fabricated to accept the product. The product depicted in FIG. 4 is a card reel which is used herein as an example of a product. This is not a limitation of the invention. The product has a label location 34, which is where the label is intended to be identically placed on each unit of product. Typically, the product is fabricated to receive the label, for example in a depression or a raised area shaped like the label. When properly placed, the product 33 fits securely in the jig. The user removes a protolabel label 11 from the label sheet by tearing along the perforations in the top and backing sheet. After removing a protolabel from label sheet, a small portion of an edge of the label 22, the second subregion of the label 26, is unprotected by the backing revealing the adhesive. The user places the protolabel/backing combination into the depression of the jig 32 designed to correspond to the registration tab 23 of the protolabel. This provides the adhesive side of the label facing the product at the label location 34 of the product and the exposed adhesive of the second subregion ready to be secured to the product. The fabrication of the jig 30 provides that, when properly placed in the jig, the product 33 is aligned facing toward the protolabel such that the label 22 is precisely registered to the product. The user then presses the second adhesive subregion 26 to the product and attaches the label to the product thereby. The jig assures that the label is adhesed to each unit of product at the precise and appropriate location and orientation. The backing is then peeled off the first subregion 28 and the user's thumb or finger, or the equivalent, is placed on the second subregion of the label 28 to fully adhese the label to the product. The user then removes the registration tab and the product, with label applied is finally removed from jig.

Example

In an embodiment, the front face of the label is designed and laid out by the user using a web site which is accessed by the user. Using the online application, the user uploads the images and design which the user desires to be printed on the label. The user saves the design and outputs the file for printing as a test sheet on a blank piece of paper. The user then uses the Alignment Check Sheet included in the "print your own" kit and places said Alignment Check Sheet on top of test print to determine if printer is aligned correctly. If adjustment of the alignment is required, the user goes back to the web site, makes the necessary adjustments and reprints a test sheet. This process is repeated until alignment is correct. This aspect of the process improves the alignment between art, label, and product. The user then inserts a label sheet with blank labels into a printer and prints the label sheet.

In an embodiment, the product is a card reel for use in holding an employee identification card on a retractable cord (as shown in FIG. 4). Commonly, the card reel is labeled with a company logo or other imprinting.

In the foregoing, the present invention has been described with reference to suitable embodiments, but these embodiments are only for purposes of understanding the invention and various alterations or modifications are possible so long as the present invention does not deviate from the claims that follow.

What is claimed is:

1. A label printing kit comprising:

a. a label sheet comprising a top sheet and a backing sheet, said top sheet having a top side and a back side said back side coated with an adhesive coating, the top sheet removably adhesed to the backing sheet and forming a combination, said combination comprising one or more removable protolabels, each protolabel comprising a label and a registration tab; and, b. a jig fabricated to receive a product with a label receiving location, and fabricated to receive said protolabel such that when the product and protolabel are positioned in the jig, said label is proximate to the product at said label receiving location.

2. The kit of claim 1 wherein said label sheet comprises multiple protolabels.

3. The kit of claim 1 wherein the label comprises a first and second subregion, such that when a protolabel is removed from said label sheet the backing sheet is removably adhesed to said registration tab and said first subregion and the second subregion is not adhesed.

4. The kit of claim 1 additionally comprising 1 or more units of product.

5. The kit of claim 1 additionally comprising an instruction sheet for the computer-based printing of labels.

6. The kit of claim 1 additionally comprising an alignment check sheet fabricated to ensure proper registration of the label to the product label location.

7. A method of applying an adhesive label to a product comprising:

a. providing a label sheet comprising a top and backing sheet, said top sheet with a top side and a back side, said back side coated with an adhesive coating, the top sheet removably adhesed to the backing sheet and forming a combination, said combination comprising one or more removable protolabels, each protolabel comprising a label and a registration tab, and said label comprising a first and second subregion;

b. providing a jig fabricated to receive said product and fabricated to additionally receive the protolabel;

c. placing the product into the jig, the product having a label receiving location to receive a label;

d. removing a protolabel from the label sheet such that the backing sheet is removably affixed to said registration tab and said first subregion and the second subregion is not affixed;

e. placing the protolabel in the jig such that the label is proximate to the label receiving location on the product;

f. adhesing the label second subregion to the product label receiving location;

g. separating the label from the registration tab and removing the registration tab from the jig; and, h. adhesing the label first subregion to the product.

8. The method of claim 7 in which a computer printer is used to print on the labels of the label sheet.

9. The method of claim 8 wherein a web-based application is used to format graphic elements and locate printing on the labels.

10. The method of claim 9 wherein a user accesses a website from a remote work station, uploads print work to be reproduced upon each label of a label sheet, loads a label sheet in a work station printer and prints the print work on the labels.

11. The method of claim 10 where, after uploading the print work, a test sheet is printed on a paper and the test sheet is compared to an alignment check sheet fabricated to gauge proper registration of the label to the product label location.

12. The method of claim 11 where the user makes an adjustment on the website to improve the alignment between at, label, and product.

* * * * *